US008832684B2

(12) United States Patent
Thober et al.

(10) Patent No.: US 8,832,684 B2
(45) Date of Patent: Sep. 9, 2014

(54) METHODS FOR IMPROVING ATOMICITY OF RUNTIME INSPECTIONS (75) Inventors: Mark A. Thober, Columbia, MD (US); J. Aaron Pendergrass, Silver Spring, MD (US); C. Durward McDonell, III, Olney, MD (US); Michael D. DiRossi, Ellicott, MD (US)

(73) Assignee: The Johns Hopkins University, Baltimore, MD (US)

( * ) Notice: Subject to any disclaimer, the term of this patent is extended or adjusted under 35 U.S.C. 154(b) by 383 days.

(21) Appl. No.: 12/818,317

(22) Filed: Jun. 18, 2010

(65) Prior Publication Data
US 2011/0010712 A1  Jan. 13, 2011

Related U.S. Application Data (60) Provisional application No. 61/268,944, filed on Jun. 18, 2009.

(51) Int. Cl.
*G06F 12/00* (2006.01)
*G06F 3/00* (2006.01)
*G06F 11/36* (2006.01)
*G06F 9/455* (2006.01)

(52) U.S. Cl.
CPC ........ *G06F 11/3612* (2013.01); *G06F 9/45537* (2013.01)
USPC .................... 718/1; 711/156; 711/162; 710/5

(58) Field of Classification Search
USPC ........... 711/162, 154, 156; 719/312; 707/203, 707/200; 702/186; 710/5
See application file for complete search history.

(56) References Cited

U.S. PATENT DOCUMENTS

| | | | |
|---|---|---|---|
| 5,347,649 A | 9/1994 | Alderson | |
| 5,678,042 A | 10/1997 | Pisello et al. | |
| 6,212,531 B1 | 4/2001 | Blea et al. | |
| 6,848,106 B1 * | 1/2005 | Hipp | 719/312 |
| 6,883,074 B2 | 4/2005 | Lee et al. | |
| 6,917,963 B1 | 7/2005 | Hipp et al. | |
| 6,981,114 B1 * | 12/2005 | Wu et al. | 711/162 |
| 7,328,226 B1 | 2/2008 | Karr et al. | |
| 7,472,383 B2 * | 12/2008 | Long et al. | 717/158 |
| 7,631,158 B2 * | 12/2009 | Chen | 711/162 |
| 7,904,278 B2 * | 3/2011 | Wilson et al. | 702/186 |
| 8,046,547 B1 * | 10/2011 | Chatterjee et al. | 711/162 |
| 2003/0131206 A1 * | 7/2003 | Atkinson et al. | 711/156 |
| 2003/0159007 A1 * | 8/2003 | Sawdon et al. | 711/154 |
| 2005/0182797 A1 * | 8/2005 | Adkins et al. | 707/200 |

(Continued)

OTHER PUBLICATIONS

Mark Thober, "Runtime Integrity Measurement", Oct. 2008, p. 1-10.*

(Continued)

*Primary Examiner* — Chun Cao
*Assistant Examiner* — Aurel Prifti
(74) *Attorney, Agent, or Firm* — Noah J. Hayward (57) ABSTRACT

A method for achieving atomicity while inspecting a running computer process using a copy-on-write process in a supervisor to generate a copy of a target's memory page being written to, prior to executing the write, the copy along with any unwritten to memory pages in the target being mapped to a measurement agent (MA) and used to reflect the state of the target at a particular moment in time which state when observed by the MA provides an atomic runtime inspection.

14 Claims, 2 Drawing Sheets

(56) References Cited

U.S. PATENT DOCUMENTS

| | | |
|---|---|---|
| 2006/0047925 A1 | 3/2006 | Perry |
| 2006/0075148 A1* | 4/2006 | Osaki ............................... 710/5 |
| 2006/0218364 A1 | 9/2006 | Kitamura |
| 2007/0022327 A1 | 1/2007 | Otsuka et al. |
| 2007/0079089 A1 | 4/2007 | Ohran et al. |
| 2007/0156985 A1* | 7/2007 | Tsai et al. ..................... 711/162 |
| 2007/0226438 A1 | 9/2007 | Erofeev |
| 2008/0216175 A1* | 9/2008 | Pike ............................... 726/22 |
| 2009/0300076 A1* | 12/2009 | Friedman et al. ............. 707/203 |

OTHER PUBLICATIONS

Grzegorz Milos and Michael Fetterman; Memory CoW in Zen; Xen Summit Fall 2007, Nov. 2007.

Michael Vrable et al.; Scalability, Fidelity, and Containment in the Potemkin Virtual Honeyfarm; SOSP'05, Oct. 23-26, 2005;Brighton, United Kingdom.

* cited by examiner

METHODS FOR IMPROVING ATOMICITY OF RUNTIME INSPECTIONS

CROSS-REFERENCE TO RELATED APPLICATIONS

This application relates to U.S. provisional application No. 61/268,944, filed on Jun. 18, 2009, which is incorporated herein by reference in its entirety.

STATEMENT OF GOVERNMENTAL INTEREST

This invention was made with Government support under contract MDA904-02-D-0302. The Government has certain rights in the invention.

BACKGROUND OF THE INVENTION

1. Field of the Invention

The present invention relates to methods for software inspection and verification and, more specifically, in one embodiment to methods for improving coherency by ensuring atomicity in runtime integrity measurements.

2. Description of the Related Art

Recent work in software integrity verification has expanded the scope of measurement collection from static load time images to running process states. Runtime integrity measurement relies on the ability of a measurement agent (MA) to observe the memory image of a running process and to construct some meaningful description of the process's current state. Both load time and runtime measurements may be evaluated by a remote appraiser as part of an access control decision. However, because runtime measurements represent fresher assertions about the target's state, one can have more confidence that decisions that include runtime measurements reflect the intent of the system owner than decisions which rely solely on load time measurements.

In some systems, a runtime measurement may consist of a cryptographic hash of critical but (presumably) static regions of the target's memory. Other systems include more complex characterizations of the target's dynamic state. No matter what technique is used it is vital that the measurement be meaningful and correct.

Unlike in load time measurement architectures, the target of a runtime measurement is running and, hence, able to change its state. In this setting, a proper measurement must reflect a coherent state of the target. This coherency property can be divided into two distinct properties which must be satisfied to obtain a coherent measurement. Atomicity requires the measurement to reflect the state of the target at a particular moment in time. Quiescence asserts that the target data is in a consistent state, i.e. not a critical section.

Without ensuring coherency of measurement, both false positive and negative results may ensue. In the former case, a failed measurement may mean unwarranted denial-of-service to the target, unnecessary rebooting, or manual inspection. Perhaps more dangerous is the latter case, where a compromised system may go undetected and continue to run, and exploit other systems that rely on the correctness of measurement. To elucidate the coherency problem, consider the effects of coherency on two example integrity measurements.

In a simple example, a system tracks two bits of information, a and b, and maintains a parity bit p. Integrity is measured by the assertion a xor b=p (i.e., the parity bit must accurately reflect the parity of the first two bits). Suppose an attacker can manipulate any of the three bits during measurement. The two parts of the coherency problem are as follows, illustrating false negative and false positive results, respectively.

Atomicity: Suppose the system starts in a bad state: 0, 1, 0. However, measurement might read the first bit, after which the attacker could switch the state to 1, 0, 0, and measurement will see 0, 0, 0 and the state is considered valid.

Quiescence: Suppose the system begins updating the state from 0,0,0 to 1,0, 1. Measurement is done between the two updates at 1,0,0 and runs to completion before the parity bit is updated. The state is therefore considered invalid.

This simple example demonstrates the necessity of coherent measurement. Failing to enforce either the atomicity or quiescence property may result in an incorrect measurement. Further, as the complexity of measurement increases, the challenge of maintaining coherency becomes more difficult, and the potential impact on the target becomes greater. Consider the following, more complex example.

A system maintains two distinct circular doubly-linked lists: in_use_list and free_list. Integrity is measured by the assertion that all elements of in_use_list have a particular flag set and elements of free_list do not. Further, there is an implicit assertion that in_use_list and free_list form distinct valid circular doubly-linked lists. The MA must walk both lists and record or validate the proposition.

Atomicity: Suppose the system starts in a bad state, where an element of in_use_list does not have the correct flag set. Measurement may finish correctly on free_list, yet before in_use_list is measured, the bit is flipped, causing measurement to be considered valid.

Quiescence: Suppose the system starts in a valid state, where both lists are valid and have the proper bits set. Suppose the measurement occurs after the target begins updating the lists, moving an element from free_list to in_use_list. Depending on when measurement takes place, one of the lists may not even be a valid circular doubly-linked list, if the pointers are in the process of changing. This may cause measurement to fail, even though the system is valid in both the prior state and the new state after the update.

This example further emphasizes the importance of coherency of measurement. Measurement must avoid the danger of an attacker changing things during measurement to escape detection. The quiescence failure in this example illustrates the fragility of runtime measurement; measurement must be done carefully to avoid measuring a target when the target is in a critical section.

A failure of atomicity is more relevant for false negatives than false positives. A false positive would mean that the system is valid at the beginning of measurement, and becomes bad during measurement. From the perspective of the point in time of measurement, reporting a bad measurement in this case is a false positive, since the state was valid at the point of the measurement. However, reporting this bad measurement at this point can hardly be considered a bad thing; in any case, an atomic measurement would not capture this invalid state, since it occurs after the point in time of measurement.

While not part of coherency, related goals of measurement are minimizing runtime overhead and avoiding target realization of measurement. A complete solution to the coherency problem will:

Ensure measurement reflects the state of the target at a single moment in time (Atomicity);

Ensure target data is in a consistent state at measurement time (Quiescence);

Maximize target performance without starving the MA; and

Be undetectable from the target/not require target participation.

Load-time measurement systems implicitly meet the coherency goal because the target of measurement is not actively modifying its state while the measurement is being performed. For example, one system hashes the file system image of key objects (such as system executables) as they are loaded by the operating system kernel. Because the measurement is performed before the image is actually executed, there is no chance that the image is in an inconsistent state.

The problem is the atomicity property for run-time measurement agents. Naive approaches can accurately enforce the atomicity property, but exact undesirable performance penalties on the target.

Pausing the target during measurement will not allow the target to update any of its memory, thus making the measurement atomic. However, this has the undesirable effect of denial-of-service to the target for the duration of measurement, which may take several seconds. An alternative approach is to copy the entire memory of the target and perform measurement on the copies. This clearly has the side-effect of wasting large portions of memory for measurement and additionally imposing a time penalty for how long it takes to copy memory.

TABLE 1

Time and Memory Overhead during Runtime Measurement

| Strategy | Memory | Activity | LKIM Runtime | Overhead Time | Memory |
|---|---|---|---|---|---|
| Pause TD | 256 MB | Idle | 0.291 s | 166.6 ms | 0 MB |
| FUll Copy | 256 MB | Idle | 0.471 s | 161.6 ms | 256 MB |
| Pause TD | 1024 MB | Idle | 0.291 s | 165.0 ms | 1024 MB |
| FUll Copy | 1024 MB | Idle | 0.995 s | 668.4 ms | 1024 MB |
| Pause TD | 256 MB | Linux kernel build | 0.952 s | 636.8 ms | 0 MB |
| FUll Copy | 256 MB | Linux kernel build | 1.076 s | 178.3 ms | 256 MB |

Table 1 above shows the time and memory overhead of the Linux Kernel Integrity Monitor (LKIM) see, e.g., P. A. Loscocco, et al., "Linux kernel integrity measurement using contextual inspection," STC '07: Proceedings of the 2007 ACM Workshop on Scalable Trusted Computing, pp. 21-29, NY, N.Y., USA, 2007) measurement for these naive strategies for identical targets with different memory sizes and different levels of activity: either idle or building the Linux kernel. On idle targets, measurement is faster, since there is less active memory to measure. For more active targets, measurement takes longer, and can be several seconds; pausing the target for this amount of time is clearly undesirable. Further, the memory overhead for performing a full copy of memory is substantial, and can add significant downtime to the target; a full copy of a 1024 MB target takes longer to complete than the time measurement takes when pausing the target domain. (Note that the pause time of the Pause Target Domain (TD) strategy is less than the LKIM runtime due to some activity before and after the actual memory measurement.)

Given the above problems with current simple, yet naive, runtime measurement approaches it should be the objective of an inventive solution to improve coherency, and particularly atomicity, of runtime measurements without an extended denial-of-service to the target and without the need for large memory or the additional time required to copy large memory.

SUMMARY OF THE INVENTION

Therefore, the present invention has been made in view of the above problems and constraints, and provides a method to achieve the above measurement objectives.

More specifically, the present invention solves the above problems to a great extent through the use of memory copy-on-write (CoW) to achieve atomicity of runtime measurement, while providing significant improvements in time and memory overhead, compared with the above naive approaches. At the beginning of measurement, CoW is enabled on the target. The target is then briefly paused for some initialization, after which the target may run during measurement. Any memory writes in the target with CoW enabled generate copies of the memory page being written to, prior to executing the write. When measurement completes, CoW is disabled, causing the copied memory to be discarded.

During measurement, the measurement agent will observe the actual target's memory for any pages that have not been written to, and the copies for any pages that have. The measurement will be atomic, since the snapshot of the target's memory is maintained in the form of copies. This results in a reduction in the target downtime and resource usage, when compared with the naive approaches, since the target is allowed to run during measurement, and only the pages of memory that change during that time are copied.

More specifically the present invention is directed to a method for achieving atomicity while inspecting a running computer process comprising implementing a copy-on-write (CoW) process in a supervisor to generate a copy of a target's memory page being written to, prior to executing the write, the copy along with any unwritten to memory pages in the target being used to reflect the state of the target at a particular moment in time which state when observed by a measurement agent (MA) provides an atomic runtime inspection.

The present invention is also directed to a method for achieving atomicity while measuring the integrity of a running computer process wherein a measurement agent (MA) is measuring a target, the method comprising:

initiating the measurement by the MA requesting a hypervisor to begin mapping the target's memory pages;

enabling a copy-on-write (CoW) in the target by the hypervisor;

generating a copy of a target's memory page being written to, prior to executing the write; and observing the copy along with any unwritten to memory pages in the target by the MA to provide an atomic runtime integrity measurement.

The present invention is further directed to a computer program product comprising a non-transitory computer usable medium having a computer readable program code embodied therein, the computer readable program code instructing a microprocessor to implement a method for achieving atomicity while inspecting a running computer process comprising using the microprocessor to implement a copy-on-write process in a supervisor to generate a copy of a target's memory page being written to, prior to executing the write, the copy along with any unwritten to memory pages in the target being used to reflect the state of the target at a particular moment in time which state when observed by a measurement agent (MA) provides an atomic runtime inspection.

The present invention is further directed to a machine for measuring the integrity of a running computer process wherein a measurement agent (MA) is measuring a target, the machine comprising a microprocessor coupled to a memory wherein the microprocessor is programmed to:

initiate the measurement by the MA requesting a hypervisor to begin mapping the target's memory pages;

enable a copy-on-write (CoW) in the target by the hypervisor;

generate a copy of a target's memory page being written to, prior to executing the write; and observe the copy along with any unwritten to memory pages in the target by the MA to provide an atomic runtime integrity measurement.

These and other objects and advantages of the present invention will be fully apparent from the following description, when taken in connection with the annexed drawings.

BRIEF DESCRIPTION OF THE DRAWINGS

The teachings of the present invention can be readily understood by considering the following detailed description in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Reference will now be made in detail to the exemplary embodiments of the present invention, examples of which are illustrated in the accompanying drawings.

Although a general strategy for atomicity of runtime integrity measurement is presented herein, the examples and experiments focus on runtime integrity measurement of the Linux kernel using the LKIM. Though the discussion focuses on measuring the kernel, copy-on-write (CoW) is applied to the memory of the entire domain, not just kernel memory. This provides support for measuring any portion of a domain's memory including all of user space, which is important if a compromised kernel stores data out-side kernel space, and allows for other measurement agents (MAs) that may want to measure more than just the kernel.

For the purposes of the following discussion, a page is assumed to be 4 KB of contiguous physical memory. Unifying with existing Xen and x86 terminology, the term page table denotes a level 1 page table, whose entries are data pages; a page directory is a level 2 page table, whose entries are either level 1 page tables or 4 MB pages. In the described embodiments, 4 MB pages are ignored, as Xen (see below) provides very limited support for 4 MB guest pages, and therefore so does the embodiment of the present invention.

One important aspect of paging is the manner in which writability of a page is determined. A read/write (R/W) flag is maintained in each page table entry (PTE), describing the R/W property of the page mapped by the PTE. This allows the same page to be mapped with a different R/W property in different PTEs. In other words, writability is a property of the mapping of a page, not a property of the page itself.

While the method of the present invention of memory copy-on-write for measurement is in the Xen hypervisor from XenSource, Inc., the focus on Xen-specific details will be only when necessary, so a rudimentary understanding of Xen will suffice. It is necessary to understand the concept of paravirtualization, which utilizes a software interface to a virtual machine (VM) that is different from the underlying hardware; the VM is aware that it is in a virtualized environment, and is in fact altered to suit this environment. In Xen, this interface is presented via hypercalls that a VM makes to the hypervisor to perform actions on its behalf, that it is not otherwise permitted to do (e.g., I/O, changes to page tables).

In the discussion that follows, the following terminology and abbreviations will be used. A domain (also guest) is a virtual machine running in Xen; a domU, meaning a normal guest domain, is to be distinguished from the domain dom0, which has special privileges to do I/O, manage other domains, etc. A measurement agent (MA) (e.g., LKIM) is the domain/entity performing measurement of a target or target domain (TD) (e.g., Linux). In addition to measuring, the MA can also inspect, for example, searching for a cryptographic key, and/or observe and, therefore, can also be called more broadly an inspection agent (IA). When necessary, the measurement agent process (MAP) is distinguished from the measurement agent kernel (MAK), since the process cannot interact with the hypervisor directly, but must go through the kernel. Also, the term snapshot is used to refer to the state of the target domain's memory at a given point in time. Finally, while the examples focus on the use of a hypervisor and, more specifically, the Xen hypervisor, the more generic category for a hypervisor is a supervisor which can include, but is not limited to, a hypervisor or an operating system kernel.

The method of the present invention of CoW in Xen is built with one necessary assumption and several simplifying assumptions. The only necessary assumption is that none of the target domain's memory be accessible using Direct Memory Access (DMA). This would permit direct writes to memory by the hardware, which would bypass the mechanism of the invention for copying pages that are being written to, and thereby break atomicity.

The embodiment of the present invention and results produced assume the following:

Only supporting x86-32 with 2-level paging, no Physical Address Extension (PAE);
No shadow paging;
No ballooning;
Paravirtualized guests;
Only one snapshot allowed per TD;
Single processor or multi-processor with TD and MA pinned to different processors; and
No paging memory to disk by the TD.

Shadow paging and balloon drivers are both additional Xen memory modes. Shadow paging adds a level of indirection to the page table structure, so the page tables the guest uses are translated into shadow page tables that the machine actually uses. This is not necessary for paravirtualized guests, so it is not currently supported. Balloon drivers are used to dynamically add or subtract memory from a domain. This creates added complexity for our purposes, particularly if pages are removed during measurement.

The current embodiment supports the TD and MA each using their own dedicated processor.

No support for memory that has been paged to disk is provided. This is not a problem when measuring the Linux kernel, as the kernel does not page any of its memory to disk.

This may be an issue for measuring other kernels (such as the Windows kernel, which does page kernel memory to disk) or measuring user processes which may have memory paged out. This is a general problem for runtime integrity measurement that exists regardless of whether or not CoW is being used, since it involves measuring a portion of virtual memory that is not actually in physical memory at the time of measurement.

Writable page tables, which a paravirtualized guest may use to write to its own page tables are supported. As discussed herein, this creates some added complexity in monitoring page table changes. Shared pages (sharing automatically generates copies) is also supported, which is important as all of the I/O for a domU occurs on shared memory, since it is not allowed to directly access hardware.

Figure 1:
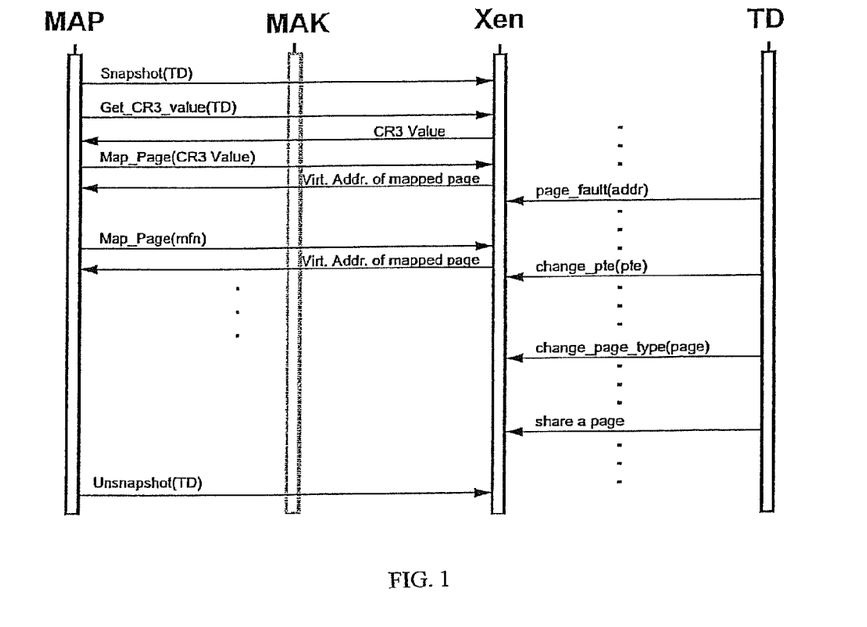
FIG. 1 illustrates the sequence of calls and events that occur when using copy-on-write in support of a runtime measurement.

FIG. 1 shows the sequence of calls and events that occur when using CoW in support of measurement. Note that the MAK is greyed, since it essentially re-wraps system calls from the MAP into hypercalls to the hypervisor. The first call is from the MAP to the MAK which causes a hypercall to Xen to begin a snapshot of TD. This triggers some initialization for CoW, as described further herein. After the initialization phase, both the MA and TD are allowed to run. Xen is responsible for copying any CoW pages when a CoW-related page fault occurs, for ensuring that any page table changes will enforce CoW on pages they refer to, and for correctly handling any page sharing involving the TD; this interface between Xen and the TD is described further herein. The interface between Xen and the MA consists of the MA asking Xen to map pages that it wishes to measure, and is also described further herein. When measurement completes, the MAP makes a call to the MAK that will make a hypercall to Xen to end CoW and do some necessary clean up, as also described further herein.

The CoW embodiment of the invention adds approximately 2000 lines of code to Xen. Before describing the embodiment of the invention, some changes to Xen and some general concepts used below are detailed.

The present invention requires changes to some Xen structures, particularly those doing memory management. To the structure keeping information about each domain, struct domain, a flag is added indicating that a domain is CoW-enabled, and a field to keep track of which domain initiated the CoW. A list is also added to struct domain, so the MA domain can keep the copies of any CoW-generated copies (as discussed below, the MA domain gets the copy, while the TD keeps the original). The struct page_info contains meta data about each page of memory. To this structure, two flags are added to the type_info field (that maintains information about the types of pages, e.g, page table or data page), one indicating if a page is a CoW page or not, and the other indicating whether or not the page has been copied. A pointer is also added from the original CoW page to where the copy resides; this allows Xen to map the copy to the MA in the event that the original has been written. In order to correctly force and handle page faults when the TD writes to a page, an available bit in each page table entry is used to keep track of the previous value of R/W flag, which will be marked read-only for CoW purposes.

In the further discussion below, reference to copying a page, includes the following sequence of events. First, create a copy of the page of memory; second, in the page_info structure for this page, set the flag indicating the page was copied; third, in the same page_info, add a pointer from the original page to the copy. Note that while the copy of memory is exactly the same as the original, the copy's page_info will be different, since the meta data about the page is different.

In the CoW method of the invention the copy is given to the MA, which is necessary for several reasons. One of the implicit goals is to not disturb the running target domain, which is more likely if giving the copy to the TD and allowing the MA to keep the original. A particular challenge occurs if the TD is using 4 MB pages, which must be contiguous physical memory in a paravirtualized guest. First, finding a 4 MB contiguous block of memory for a copy may be difficult, if not impossible. Secondly, portions of the 4 MB page are allowed to be mapped as 4 KB pages. If a page fault occurs on a 4 MB page after one of the 4 KB pages has already been copied, replacing the copied 4 KB page inside the copied 4 MB page would be overly burdensome. Giving the copy to the TD alleviates this problem, as it does not require the 4 MB block to be mapped as 4 MB of contiguous physical memory, but can instead be mapped as several 4 KB pages.

In addition to this 4 MB page problem, whichever domain gets the copy will suffer a performance penalty, since any mappings of the original page will have to change to point to the copy. Were the copy to go to the TD, this would require a full page table walk to determine all locations where the page is mapped. As described below, better control is maintained over the mappings to the MA and a full page table walk is avoided. This fits with the goal to maximize target performance. Further, by giving the MA the copy, we can avoid any MMU-direct changes and avoid race conditions with the MA walking the page tables of the TD.

Figure 2:
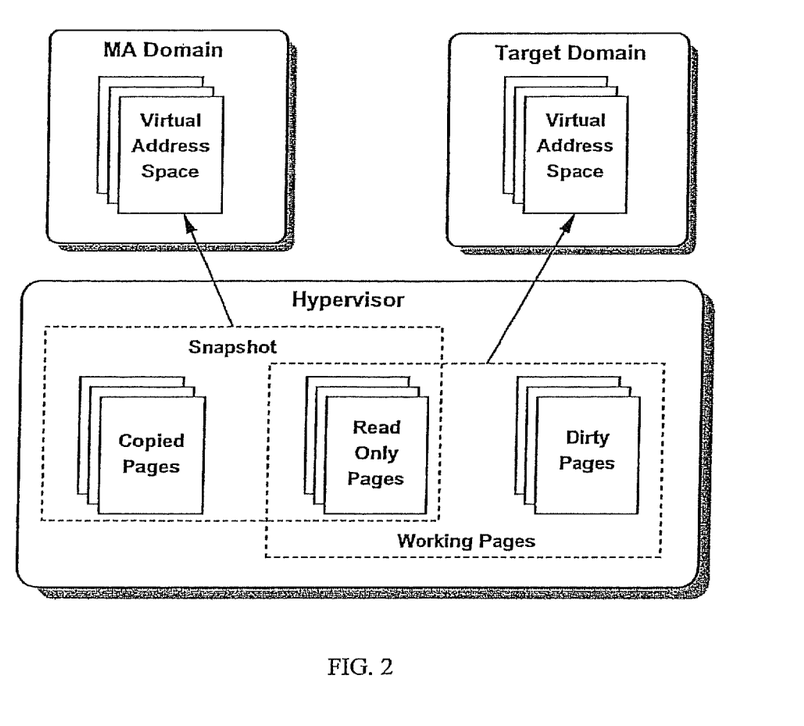
FIG. 2 illustrates the layout of memory when copy-on-write is enabled.

FIG. 2 shows the layout of memory when CoW is enabled. The hypervisor controls access to physical memory. The set of working pages owned by the TD consist of those that are read-only, if they have not been written to during CoW, and a set of dirtied pages that have been written to. These are pages mapped into the virtual address space of the TD. On the other side, the MA domain may have some combination of copied pages and read-only pages of the TD mapped into its virtual address space (it will have its own pages mapped as well). This ensures that the pages it is measuring will result in an atomic measurement.

If there is insufficient memory for a copy of a page at any point during CoW, the TD is paused until unsnapshot is called. This allows an atomic measurement to run to completion, assuming that performing measurement is more important than starving the TD. Alternatively, the MA could be allowed to decide whether it wants to complete or abort measurement if memory exhaustion occurs, in such cases where starving the TD is undesirable.

When the hypercall snapshot (td) is received by Xen, the following operations occur:
1. Copy all TD page tables immediately;
2. Copy any pages shared to or from the TD;
3. Mark all pages in TD CoW;
4. Mark all page table entries (PTE's) in TD Read-Only; and
5. Copy the TD registers at time of snapshot.

Copying all TD's page tables immediately is necessary since they are changed in step 4. This will likely also result in time saving, as the page tables are likely to change anyway. Pages that are owned by the TD and shared with another domain are copied so CoW does not disturb the domain they are shared with, which may write to them (especially for I/O purposes). Similarly, pages owned by another domain that are shared to the TD are also copied up front.

All of the pages in the target domain are then marked as CoW. This is done by marking a flag in the type_info field of the page_info struct corresponding to the page, which has been reserved for CoW purposes. It may be desirable to permit CoW enabling for only the portions of the target domain's memory that involve measurement, though this is not currently supported.

All of the page table entries (PTE's) in the target domain are then marked as read-only (RO), and the previous state of the R/W flag is saved in an available bit. This ensures that any writes to one of the target domain's pages will trigger a page fault, so a copy can be generated and the R/W flag reverted to its prior state. In truth, a PTE is only changed to read-only if the page that it refers to has not already been copied.

Finally, copies of the target domain's registers are made, so the MA can read the register values at the time of the snapshot. This is particularly relevant for the CR3 register, which contains a pointer to the page directory. The MA needs this value to determine the locations of the pages it wants to measure.

The following activities of the TD require additions to the hypervisor to support CoW:
Page faults;
Page table changes;
  Changes to PTE's (if relevant, entry must stay RO); and
  A page becomes a page table (if relevant, all entries must be marked RO); and
Share a page.

Since all of the PTE's in the TD are marked as read-only, any of the resulting page Faults must be handled. If the page fault is a write fault on a CoW page, then it must be handled. Handling the fault entails copying the page as described herein, if the page was not already copied. After the page has been copied, the R/W flag is reverted to its state prior to CoW initialization. Finally, any current mappings of the original page in the MA must be updated to point to the copy instead.

In order to ensure that writes in the TD trigger page faults, any time a PTE changes or a new page table is created, any entries referring to uncopied CoW pages must be read-only (if the page has been copied, the TD is free to write to it). When a PTE changes, the R/W bit that it would change to is saved, and the entry marked read-only, so the PTE entry will act just as those that were present when CoW was initialized. In a similar fashion, when a data page is elevated to a page table, before installing the page table, the R/W bit of each entry is saved, and marked read-only. Note that these changes are not relevant for the page directory, since the R/W flag is only enforced on page tables, so there is no need to mark entries in the page directory read-only.

Changes to page tables can occur in a couple of ways, which add to the complexity of the method of the invention. A fully paravirtualized guest may issue hypercalls asking Xen to change a PTE, since the guest is not allowed write access to its page tables. However, Xen also supports a writable page table mode, where the guest is given write access to its (level 1) page tables. In this case, instead of permitting the guest to truly write to the page table, Xen actually emulates the instruction to update the PTE and verifies the result, giving the guest the illusion of writable page tables. The method of the invention supports both writable page tables and hypercalls for updates.

When a page owned by the TD is shared to another domain, the page is simply copied prior to sharing. This is to avoid affecting the sharing domain, since read-only page faults would have to be forced for its mapping of the page also. Since a page is being shared, it is likely that it is about to be written to anyway. Nothing is done when a page owned by another domain is shared to the TD, since it would not have been part of the TD's memory at the time of the snapshot.

As shown in FIG. 1, during measurement, the interface between the MA and the Xen hypervisor consists of the MA asking Xen to map pages of the TD for measurement. The first thing the MA will do is ask for the value of CR3 at the time of the snapshot. The MA will then request Xen to map the page corresponding to this CR3 value. This map call will ask for the machine frame number (mfn) of the page pointed to by CR3 for the snapshot. Since this page was copied, and the original may have changed, Xen maps in the copy. Once this page is mapped, the MA will have a handle on the page tables of the TD at the time of snapshot. The MA will then continue to ask for TD pages it wants to measure. Each map request entails the following sequence of actions:
  The MA will request to map a page by mfn;
  Xen consults the page_info struct for this page to see if it has been copied;
  If so, Xen gets the address of the copied page from page_info, and maps the copy; and
  If not, Xen maps the original page, and maintains a reverse mapping from physical pages to where they are mapped, in case the original page is later copied.

The decision to map the copy or the original is transparent to the MA, which is not concerned with whether the copy or the original was mapped when performing measurement. The reverse mapping is an important step that was alluded to herein regarding page faults. In the case where the MA has an original page mapped, the same page will be shared with the TD. In the event that the TD writes to this page, a copy will be generated. In order to obtain a correct measurement, the MA will need to be updated to look at the copy rather than the (about to change) original. To simplify this task, Xen maintains this reverse mapping, so that whenever a page fault occurs in the TD that generates a new copy, Xen can transparently update the MA mappings of this page. Without this mapping, Xen would be forced to do a complete page table walk of the MA to determine where the page was mapped in, which is a very expensive operation.

When the hypercall unsnapshot (td) is received by Xen, the hypervisor completes the following sequence of operations:
  1. Unmark CoW flags for all pages in TD;
  2. Revert R/W flag for all PTE's in TD to original value;
  3. Unmap any TD pages (originals or copies) mapped by the MA; and
  4. Free all page copies and scrub their contents.

These operations are straightforward. All of the flags in the page_info struct are returned to their prior state, and all PTE's revert to their pre-CoW state as well (for uncopied pages, the PTE's for any copied pages were already reverted). All of the copies are then freed and placed on a scrub list to clear the content of the pages. The domain changes are also cleaned up, such as unmarking the enable CoW flag; these steps are again straightforward.

The methodology for ensuring CoW is functioning properly from the target domain's perspective is to compare the memory at the actual time of the snapshot with the CoW copies and current pages at the time the snapshot ends. Hence, for testing purposes, when snapshot (td) is called, a full copy of the td's memory is created. At unsnapshot (td), a check of all pages owned by the domain is made to ensure that any CoW copies are the same as the original and any uncopied current pages are also the same as the original, as they must not have been modified (else they would have been copied). A series of tests were run including domains while idle, running a memory intensive application, and building the Linux kernel. These tests all showed that the method of invention correctly copied pages, apart from the console "magic page" that dom0 updates on keyboard input. This page is not a shared page and is set up by dom0 when the domain is created, and is not specifically tracked by Xen.

The method of the invention is compared with the goals of solving the coherency problem described above and repeated here:

Ensure measurement reflects the state of the target at a single moment in time (Atomicity);

Ensure target data is in a consistent state at measurement time (Quiescence);

Maximize target performance without starving the measurement agent; and

Be undetectable from the target/not require target participation.

The method of the invention using CoW accomplishes the first goal of obtaining an atomic measurement. As described herein, for the tests run, at the end of CoW, any pages modified by the TD were successfully copied before modification, and any uncopied pages were the same as at the beginning of CoW. As discussed above, the quiescence problem is not addressed by the inventive method.

While the inventive method does not require the target to participate in measurement, enforcing that measurement is undetectable is more challenging. The method for forcing page faults on writes changes all of the page table entries of the TD. Since a paravirtualized guest has access to its page tables, it would not be difficult for the TD to notice that all of the entries have changed. However, at this point, it would be too late for the target to change things to avoid detection, because CoW will already be active. So, the TD may know that it is being measured, but be unable to affect measurement. Xen's shadow page mode can eliminate this detection, as this implements another level of indirection in the page tables, so the pages used by the machine are different from the pages the domain uses. It is also possible that the TD may be able to observe other resource usage, particularly if running on a single processor that is shared with the MA.

The performance results are based on a target domain that runs as a dom U and a measurement domain running as dom0. The measurement was run from dom0 since mapping another domain's memory is a privileged operation that cannot normally be done by a dom U.

Some performance results comparing Linux kernel measurements with LKIM using the CoW method of the invention, measurement that pauses the TD, and no measurement are now presented. All benchmarks were run on a Dell Optiplex 745 with an Intel Core2 Duo 2.66 GHz processor, with the TD pinned to one processor, and the MA pinned to the other; hence, both the TD and MA are running as single processor domains, but are dedicated to different processors. Pinning the TD and MA to different CPUs allows accurate determination of the effects of each measurement strategy on the benchmarks without measurement competing for the CPU that the TO is using. The benchmarks used are compiling the Linux kernel and Webstone 2.5, a network-based benchmark.

The LKIM configuration used in the experiments performs measurement of the Linux kernel's virtual file system (VFS). As discussed herein, other portions of the kernel could be measured, which may cause an additional impact on performance. Recall from previous discussions that the entire memory of the TD is being snapshotted, which is reflected in the results (particularly the memory overhead due to the full copy strategy).

While comparisons between CoW and pausing the TD are given, it is important to note that pausing the TD means the TD is inactive for the length of measurement, while CoW allows the target to run. This alone presents a significant improvement of CoW over the former approach, as the TD will only be paused for short periods of time for CoW initialization and deinitialization (approx. 5-7 milliseconds in both cases), and when handling page faults.

Building the Linux kernel is a good test of memory usage, CPU usage, and disk I/O. Table 2 shows a comparison of compiling the Linux kernel with four different measurement strategies: no measurement, pause the TD during measurement, perform a full copy of the TD's memory, and enable CoW of the TD during measurement.

For these benchmarks, the TD had 256 MB of memory. The strategy for performing measurement was to run LKIM on the TD every five seconds (i.e. measure, then sleep for five seconds before measuring again). The results in Table 2 consist of an average over 10 kernel builds.

TABLE 2

| Measure Strategy | Runtime | Diff. | Avg. # Meas. | Avg. Meas. Time | Avg. Overhead per Measurement | | |
|---|---|---|---|---|---|---|---|
| | | | | | Init. | Deinit. | Memory |
| None | 5.21.19 | — | — | — | — | — | — |
| Pause TD | 5.59.02 | 11.77% | 59.4 | 0.952 s | 636.8 ms | | 0 MB |
| Full Copy | 5.35.94 | 4.59% | 55.1 | 1.076 s | 173.52 ms | 4.85 ms | 256.0 MB |
| COW | 5.26.11 | 1.53% | 54.3 | 0.989 s | 5.91 ms | 6.07 ms | 18.1 MB |

The left portion of Table 2 shows the average per-build characteristics: the average kernel build time over the 10 builds, the average difference of each strategy with no measurement, and the average number of measurements completed per build (note that longer runtimes mean more measurements will be done). The right portion of the table shows the per-measurement characteristics: average time of each measurement, and average overhead per measurement, including average initialization and deinitialization time (when the target is paused), and average additional memory usage. Note that pausing the TD has no distinction of initialization/deinitialization, since the TD is paused for the length of measurement; also note that the difference between measurement time and overhead time is due to LKIM performing some initialization before actual measurement and outputting the results after measurement. Initialization of the full copy consists of copying the entire memory of the TD, and deinitialization releases that memory. CoW initialization (Snapshot), and CoW deinitialization (Unsnapshot) are as described herein.

In these experiments, pausing the TD caused the most significant slowdown to the kernel build, with more than eleven percent increase in the build time. While the average measurement time was the least in this strategy, the TD was down for more than half a second per measurement. Performing a full copy at each measurement introduces less overhead to the kernel build time than pausing the TD, but requires a large memory overhead to achieve. The initialization time to copy all of the memory takes a significant amount of time all at once, and will increase with the amount of memory given to the TD. Measurement time also takes longer, which is most likely due to the required translation process of the MA asking for pages based on the original addresses, which must be remapped to where the copies reside.

Of the three strategies, CoW had the best performance on building the Linux kernel, adding just over one and a half percent to the build time. The additional measurement time compared with pausing the TD is negligible. The average initialization and deinitialization times show that the TD will be paused for about 6 ms at a time, much improved over the other strategies. Considering the savings in downtime of the TD, the additional 18 MB of memory overhead is manageable, especially when compared with performing a full copy.

In order to test the impact of CoW-enabled measurements on network I/O, the Webstone 2.5 benchmark was run; this benchmark uses several clients to fetch pages from a web server. In the results, the TD was the server and the clients were running on a remote machine. The TD had 256 MB of memory. Table 3 shows a comparison of this benchmark between the same strategies as before: no measurement, pause the TD during measurement, perform a full copy of the TD's memory, and enable copy-on-write of the TD during measurement.

TABLE 3

| Measure Strategy | Runtime | Server Thruput (Mb/sec) | Diff | Avg. Resp. Time | Diff | Avg. # Meas. | Avg. Meas. Time | Avg. Overhead per Measurement | | |
|---|---|---|---|---|---|---|---|---|---|---|
| | | | | | | | | Init. | Deinit. | Memory |
| None | 20 m | 92.618 | — | 0.0553 s | — | — | — | — | — | — |
| Pause TD | 20 m | 90.234 | 2.57% | 0.0568 s | 2.7% | 225.8 | 0.315 s | 161.93 ms | | 0 MB |
| Full Copy | 20 m | 90.25 | 2.55% | 0.0567 s | 2.53% | 217.4 | 0.509 s | 161.97 ms | 5.29 ms | 256.0 MB |
| CoW | 20 m | 92.606 | 0.01% | 0.0553 s | 0% | 224.6 | 0.333 s | 6.59 ms | 5.97 ms | 1.4 MB |

The strategy for performing measurement, was as before, to run LKIM on the TD every five seconds (i.e. measure, then sleep for five seconds before measuring again). The results in Table 3 consist of an average over 5 runs of Webstone.

The benchmark results shown are Server Thruput (higher is better) and Average Response Time (lower is better). This benchmark is less file system intensive, so it does not take LKIM as long to perform measurement. Hence pausing the TD or performing a full copy causes less than a three percent overhead to the results. Interestingly, the amount of time it takes to perform the full copy of memory takes about the same amount of time as when pausing the TD, but uses an additional 256 MB of memory.

Enabling CoW for measurement performs essentially the same as the benchmark with no measurement. For both the Server Thruput and Average Response Time, CoW performs better than both Pausing the TD and Full Copy, with a slight decrease in the amount of measurement time compared with Pausing the TD. The reduced performance for the naive strategies is likely a result of the TD being paused for longer periods of time all at once. CoW permits the TD to run while being measured, which improves the liveness of the server. The amount of memory overhead for CoW is small, since the measurement time is short, and the webserver does not modify much memory when serving these pages.

In the benchmark experiments, the Cow method of the invention for enforcing atomicity caused a significant decrease in the time overhead that measurement imposes on the target. The memory overhead of CoW during measurement is relatively small and substantially less than the full copy strategy. In addition, CoW pauses the TD for much less time than the other approaches, thereby improving the liveness of the TD during measurement.

The experiments used an LKIM configuration that measured the virtual file system (VFS) of the Linux kernel. Measuring more of the kernel, such as the scheduler, device driver, and networking systems would cause an increase in the length of measurement time and the size of memory being measured. Additionally, the size of the kernel's object graph grows with the activeness of a domain. So, as a domain becomes more active, the data structures maintained by the kernel become larger. Both of these concerns—increasing the size of the kernel's object graph and measuring more of the object graph—will contribute to longer measurement runtimes, and therefore larger overhead due to measurement. The value of inventive CoW method to support atomicity of measurement will be greater as measurement runtime increases.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope of the appended claims.

What is claimed is:

1. A method for achieving atomicity while inspecting a running computer process, comprising:
   initializing an atomic runtime inspection process;
   implementing, based at least in part on the atomic runtime inspection process, a copy-on-write (CoW) process on memory of a target including both kernel memory and all corresponding user space of the target, the CoW process being implemented in a supervisor to generate a copy of a target's memory page being written to, prior to executing a write, the copy along with any unwritten to memory pages in the target being used to reflect the state of the target at a particular moment in time which state when observed by a measurement agent (MA) provides an atomic runtime inspection, and the copy being generated in memory of the MA; and
   freeing the copy and scrubbing contents of the copy from memory of the MA based at least in part on termination of the atomic runtime inspection process,
   wherein the supervisor maps the copy of the target's memory page and any unwritten to memory pages to the MA, and
   wherein the implementing the CoW process further comprises, in response to a page fault that is a write fault on the copy, reverting a read/write flag of the copy to a state of the read/write flag prior to the initializing and updating a mapping of the target's memory page at the MA to point to the copy.

2. The method as recited in claim 1, wherein the supervisor maintains a reverse mapping from the unwritten to memory pages in the target to where the unwritten to memory pages are mapped in the MA.

3. The method as recited in claim 1, wherein the supervisor is an operating system kernel.

4. The method as recited in claim 1, wherein the supervisor is a hypervisor.

5. The method as recited in claim 4, wherein the hypervisor is a Xen hypervisor.

6. A method for achieving atomicity while measuring the integrity of a running computer process wherein a measurement agent (MA) is measuring a target, the method comprising:

initiating a measurement by the MA requesting a hypervisor to begin mapping the target's memory pages in response to initialization of an atomic runtime integrity process;

enabling a copy-on-write (CoW) in the target by the hypervisor based at least in part on the MA requesting to begin mapping, the CoW being implemented on memory of the target including both kernel memory and all corresponding user space of the target;

generating a copy of a target's memory page being written to in memory of the MA, prior to executing the write;

observing the copy along with any unwritten to memory pages in the target by the MA to provide an atomic runtime integrity measurement; and freeing the copy and scrubbing contents of the copy of the target's memory page from memory of the MA based at least in part on termination of the atomic runtime inspection process, wherein the hypervisor maps the copy of the target's memory page and any unwritten to memory pages to the MA, and wherein the enabling the CoW further comprises, in response to a page fault that is a write fault on the copy, reverting a read/write flag of the copy to a state of the read/write flag prior to the initializing and updating a mapping of the target's memory page at the MA to point to the copy.

7. The method as recited in claim 6, wherein the supervisor maintains a reverse mapping from the unwritten to memory pages in the target to where the unwritten to memory pages are mapped in the MA.

8. A computer program product comprising a non-transitory computer usable medium having a computer readable program code embodied therein, the computer readable program code instructing a microprocessor to implement a method for achieving atomicity while inspecting a running computer process comprising using the microprocessor to:

initialize an atomic runtime inspection process;

implement, based at least in part on the atomic runtime inspection process, a copy-on-write process on memory of a target including both kernel memory and all corresponding user space of the target, the CoW process being implemented in a supervisor to generate a copy of a target's memory page being written to, prior to executing a write, the copy along with any unwritten to memory pages in the target being used to reflect the state of the target at a particular moment in time which state when observed by a measurement agent (MA) provides an atomic runtime inspection, and the copy being generated in memory of the MA; and freeing the copy and scrubbing contents of the copy from memory of the MA based at least in part on termination of the atomic runtime inspection process, wherein the supervisor maps the copy of the target's memory page and any unwritten to memory pages to the MA, and wherein the implementing the CoW process further comprises, in response to a page fault that is a write fault on the copy, reverting a read/write flag of the copy to a state of the read/write flag prior to the initializing and updating a mapping of the target's memory page at the MA to point to the copy.

9. The method as recited in claim 8, wherein the supervisor maintains a reverse mapping from the unwritten to memory pages in the target to where the unwritten to memory pages are mapped in the MA.

10. The method as recited in claim 8, wherein the supervisor is an operating system kernel.

11. The method as recited in claim 8, wherein the supervisor is a hypervisor.

12. The method as recited in claim 11, wherein the hypervisor is a Xen hypervisor.

13. A machine for measuring the integrity of a running computer process wherein a measurement agent (MA) is measuring a target, the machine comprising a microprocessor coupled to a memory wherein the microprocessor is programmed to:

initiate a measurement by the MA requesting a hypervisor to begin mapping the target's memory pages based at least in part on an atomic runtime inspection process;

enable a copy-on-write (CoW) in the target by the hypervisor based at least in part on the MA requesting to begin mapping;

generate a copy of a target's memory page being written to in memory of the MA, prior to executing the write;

observe the copy along with any unwritten to memory pages in the target by the MA to provide an atomic runtime integrity measurement; and freeing the copy and scrubbing contents of the copy of the target's memory page from memory of the MA based at least in part on termination of the atomic runtime inspection process, wherein the hypervisor maps the copy of the target's memory page and any unwritten to memory pages to the MA, and wherein the enabling the CoW further comprises, in response to a page fault that is a write fault on the copy, reverting a read/write flag of the copy to a state of the read/write flag prior to the initializing and updating a mapping of the target's memory page at the MA to point to the copy.

14. The method as recited in claim 13, wherein the hypervisor maintains a reverse mapping from the unwritten to memory pages in the target to where the unwritten to memory pages are mapped in the MA.

* * * * *